(12) United States Patent
Kawazu et al.

(10) Patent No.: US 7,351,476 B2
(45) Date of Patent: Apr. 1, 2008

(54) TWO-PACKAGE CURING TYPE POLYURETHANE COATING COMPOSITION AND COATED ARTICLE

(75) Inventors: Kenji Kawazu, Nagoya (JP); Mika Kai, Toyota (JP); Hirokazu Yoshida, Hirakata (JP); Yasuhiro Nakano, Hirakata (JP)

(73) Assignees: Toyota Jidosha Kabushiki Kaisha, Toyota-shi (JP); Nippon Bee Chemical Co., Ltd., Hirakata-shi (JP)

( * ) Notice: Subject to any disclaimer, the term of this patent is extended or adjusted under 35 U.S.C. 154(b) by 399 days.

(21) Appl. No.: 10/980,185

(22) Filed: Nov. 4, 2004

(65) Prior Publication Data
US 2005/0123770 A1  Jun. 9, 2005

(30) Foreign Application Priority Data
Nov. 5, 2003  (JP) .............................. 2003-376187

(51) Int. Cl.
B32B 27/40 (2006.01)
C08J 3/00 (2006.01)
C08K 3/20 (2006.01)
C08L 75/00 (2006.01)

(52) U.S. Cl. .................. 428/423.1; 524/196; 524/198; 524/589; 524/590

(58) Field of Classification Search ............. 428/423.1; 528/44; 524/196, 198, 589, 590
See application file for complete search history.

(56) References Cited

U.S. PATENT DOCUMENTS

| 5,021,520 A | 6/1991 | Reiff et al. |
| 5,786,419 A * | 7/1998 | Meier-Westhues et al. . 524/590 |
| 5,962,620 A | 10/1999 | Reich et al. |
| 6,098,889 A * | 8/2000 | Ogawa et al. ............... 235/492 |
| 6,254,937 B1 | 7/2001 | Schafheutle et al. |

FOREIGN PATENT DOCUMENTS

| EP | 0 388 781 A2 | 9/1990 |
| EP | 0 978 549 A1 | 2/2000 |
| JP | 7-292053 | 11/1995 |
| JP | 8-3881 | 1/1996 |
| JP | 8-199483 | 8/1996 |
| JP | 2000-185321 | 7/2000 |
| WO | WO 94/28045 | 12/1994 |

OTHER PUBLICATIONS

Database WPI, AN 1996-368468, XP-002318050, JP 08-176491, Jul. 9, 1996.
Database WPI, AN 1998-292354, XP-002318051, JP 10-101993, Apr. 21, 1998.
Database WPI, AN 1996-017255, XP-002318052, JP 07-292053, Nov. 7, 1995.
Database WPI, AN 1996-408933, XP-002318053, JP 08-199483, Aug. 6, 1996.

* cited by examiner

*Primary Examiner*—Thao Tran
(74) *Attorney, Agent, or Firm*—Oblon, Spivak, McClelland, Maier & Neustadt, P.C.

(57) ABSTRACT

The present invention aims to give a two package curing type polyurethane coating composition which can form a film having soft, wet and dry feelings simultaneously and which maintains general properties such as designing property, film strength, pot life, resistance to scratching and discoloration, resistance to stains with fats and oils and the like, and to provide a coated article with the coating composition. The two package curing type polyurethane coating composition comprises a resin solution containing an acrylic polyol and a curing agent solution containing a polyisocyanate. The resin solution contains urethane resin beads (A) in the amount of 25 to 50 parts by weight and an organic matting agent (B) in the amount of 3 to 10 parts by weight, and the total of (A) and (B) is at least 30 parts by weight in 100 parts by weight of solid contents of the resin solution. And the equivalent ratio of OH groups/NCO groups of the acrylic polyol and the polyisocyanate is in the range of 4.5:1 to 1.5:1.

15 Claims, No Drawings

TWO-PACKAGE CURING TYPE POLYURETHANE COATING COMPOSITION AND COATED ARTICLE

TECHNICAL FIELD

The present invention relates to a two package curing type polyurethane coating composition and a coated article.

BACKGROUND ART

Since automotive interior parts such as an installment panel, a center console, a door trim, and the like and light electric parts such as a radio cassette recorder, a computer housing, and the like are required to have depth and high grade impression, they are coated with a mat coating composition such as a mat solid color and a mat metallic color (e.g., reference to Japanese Kokai Publication 2000-185321, Japanese Kokai Publication Hei-08-199483, Japanese Kokai Publication Hei-08-3881 and Japanese Kokai Publication Hei-07-292053).

With respect to such a mat coating composition, coating compositions excellent in physical properties such as the high designing property, absorption/release property, resistance to scratching, hiding property, and discoloration resistance and also excellent in feeling of touch have been required. That is, at the time of use, they are often brought into contact with the skin, so that it is very desirable for them to give excellent feeling of touch.

With respect to such a mat coating composition, it is particularly preferable for the coating composition to have soft and wet feeling and at the same time smooth and dry feeling without sticky impression as well. Generally, it is difficult to form a film satisfying all of these properties and in many cases, some of the physical properties are inferior. It is particularly difficult to satisfy both wet feeling and dry feeling simultaneously and if one property is tried to be excellent, the other property is easily deteriorated. Further, even if the feeling of touch is excellent, unless other physical properties, e.g. the designing property, film strength, resistance to scratching, discoloration resistance, pot life, and resistance to stains of fats and oils, which are general properties of coating compositions, are maintained, the coating compositions cause problem for practical use.

Japanese Kokai Publication 2000-185321 describes a coating composition comprising a polyurethane fine powder and either a thermosetting resin or a thermoplastic resin and the feeling of touch and apparent feeling are described to be good. However, it does not give high grade feeling of touch simultaneously satisfying soft, wet, and dry feelings and therefore, it is required for the composition to give improved feeling of touch.

Japanese Kokai Publication Hei-08-199483 describes that a surface treatment composition comprising a synthetic resin as a binder, a resin powder, and an organic natural product powder and that a film obtained from such a surface treatment composition is excellent in appearance and feeling of touch (soft feeling). However, even such a surface treatment composition does not give high grade feeling of touch simultaneously satisfying soft, wet, and dry feelings and therefore, it is required for the composition to give improved feeling of touch.

Japanese Kokai Publication Hei-08-3881 describes a molded product having a suede-like surface obtained by thermally molding a resin sheet having a suede-like film layer comprising mainly a binder resin and colored beads. Such a molded product having a suede-like surface is described as that the product is excellent in appearance and feeling. However, even such a film layer does not give high grade feeling of touch simultaneously satisfying soft, wet, and dry feelings and therefore, it is required to improve its feeling of touch.

Japanese Kokai Publication Hei-07-292053 describes a polyurethane resin fine powder to be used for a coating composition. Further, it describes an anti-glare coating composition using such a polyurethane resin fine powder and an aim to give soft feeling. However, even such a film layer does not give high grade feeling of touch simultaneously satisfying soft, wet, and dry feelings and therefore, it is required to improve its feeling of touch.

DISCLOSURE OF THE INVENTION

Taking the above-mentioned problems into consideration, the present invention aims to give a two package curing type polyurethane coating composition which can form a film having soft, wet and dry feelings simultaneously and which maintain general properties of a coating composition such as the designing property, film strength, resistance to scratching, discoloration resistance, pot life, resistance to stains with fats and oils, and the like and to provide a coated article with such a two package curing type polyurethane coating composition.

The present invention relates to a two package curing type polyurethane coating composition comprising a resin solution containing an acrylic polyol and a curing agent solution containing a polyisocyanate, wherein the resin solution contains urethane resin beads (A) in the amount of 25 to 50 parts by weight and an organic matting agent (B) in the amount of 3 to 10 parts by weight and contains the urethane resin beads (A) and the organic matting agent (B) in total of 30 parts by weight or more, respectively, to 100 parts by weight of solid contents of the resin solution, and the acrylic polyol and the polyisocyanate have OH group/NCO group (equivalent ratio) in the range of (4.5/1) to (1.5/1).

Preferably, the above-mentioned acrylic polyol has a glass transition temperature (Tg) of $-10°$ C. or lower.

Preferably, the above-mentioned organic matting agent (B) is a grounded silk powder product.

Preferably, the above-mentioned resin solution contains an organotin curing catalyst in the amount of 0 to 0.05 part by weight to 100 parts by weight of the solid contents of the resin solution.

Further, the present invention relates to a coated article having a film on the surface, wherein said film is formed using the above-mentioned two package curing type polyurethane coating composition.

Hereinafter, the present invention will be described more in details.

The present invention provides a two package curing type polyurethane coating composition comprising a specified resin solution and a specified curing agent solution and suitable to coat automotive interior parts such as an installment panel, a center console, a door trim, and the like and light electric parts such as a radio cassette recorder, a computer housing, and the like.

The resin solution of the two package curing type polyurethane coating composition of the present invention contains an acrylic polyol. The acrylic polyol is an acrylic resin having hydroxyl groups. The acrylic polyol is not particularly restricted but may be any acrylic polyol having reactivity with polyisocyanate and examples thereof may include compounds obtained by polymerization of a mixture of unsaturated monomers selected from unsaturated monomers containing a hydroxyl group, unsaturated monomers containing an acid group, and other unsaturated monomers.

The above-mentioned unsaturated monomer containing a hydroxyl group is not particularly restricted and examples thereof may include hydroxyethyl acrylate, hydroxyethyl methacrylate, hydroxypropyl methacrylate, hydroxybutyl acrylate, Placcel FM-1 (manufactured by Daicel Chemical Industries; ε-caprolactone-modified hydroxyethyl methacrylate), polyethylene glycol monoacrylate or monomethacrylate, and polypropylene glycol monoacrylate or monomethacrylate.

The above-mentioned unsaturated monomer containing an acid group is not particularly restricted and examples thereof may include carboxylic acids such as acrylic acid, methacrylic acid, itaconic acid, crotonic acid, and maleic acid.

The above-mentioned other unsaturated monomers are not particularly restricted and examples thereof may include acrylic monomers containing an ester group such as methyl, ethyl, propyl, butyl, hexyl, ethylhexyl, and lauryl acrylate or methacrylate esters; vinylalcohol ester type monomers such as esters of carboxylic acids, e.g. acetic acid and propionic acid with vinyl alcohol; unsaturated hydrocarbon monomers such as styrene, α-methylstyrene, vinylnaphthalene, butadiene, and isoprene; nitrile type monomers such as acrylonitrile and methacrylonitrile; and acrylamide type monomers such as acrylamide, methacrylamide, N-methylolacrylamide, N,N-dimethylacrylamide, and diacetoneacrylamide.

The above-mentioned acrylic polyol preferably has a glass transition temperature (Tg) of $-10°$ C. or lower. Use of an acrylic polyol having Tg of $-10°$ C. or lower makes it possible to obtain a coating composition giving a film excellent in soft feeling and resistance to scratching. The Tg of the acrylic polyol is further preferably $-15°$ C. or lower. In this description, Tg is a value calculated from Tg of the respective homopolymer obtained by the respective monomers and the weight ratios of the respective monomers to be used for the production of the copolymer.

The acrylic polyol preferably has a hydroxyl value of 90 to 200 KOHmg/g and a weight average molecular weight of 20000 to 80000.

The resin solution contains urethane resin beads (A) of 25 to 50 parts by weight to 100 parts by weight of solid contents of the resin solution. Addition of the urethane resin beads (A) gives a coating composition from which a film excellent in the soft and wet feelings can be formed. In the present invention, it is needed to use the urethane resin beads (A) as resin beads and in the case of using, for example, acrylic resin beads or other resin beads, sufficient wet feeling cannot be obtained. If the content of the urethane resin beads (A) is less than 25 parts by weight, the wet and soft feelings cannot be sufficient and the produced film is inferior in the feeling of touch. If the content of the urethane resin beads (A) is more than 50 parts by weight, the film is inferior in the strength and the physical properties of the film cannot be maintained. The content of the urethane resin beads (A) is more preferably 28 parts by weight or more, and furthermore preferably 30 parts by weight or more. Also, the content of the urethane resin beads (A) is more preferably 45 parts by weight or less, and furthermore preferably 42 parts by weight or less.

The urethane resin beads (A) preferably have an average particle diameter of 5 to 25 μm, more preferably 5 to 20 μm. If it is less than 5 μm, the viscosity of the coating composition is increased and the nonvolatile components are decreased at the time of coating to adversely lower the transfer efficiency and if it is lager than 25 μm, the smoothness of the film may be deteriorated adversely. The particle diameter is more preferably 20 μm or smaller.

The urethane resin beads (A) preferably have an elasticity value of 200 g or less. If the elasticity value exceeds 200 g, it becomes difficult to obtain good feeling of touch and therefore, it is not preferable. The lower limit of the elasticity value is not particularly restricted, however it is preferably 50 g or more.

Any types of urethane resin beads (A) may be used depending on the desired designs regardless of the color, colorless property, transparency, or opaqueness. The urethane beads (A) are not particularly restricted and examples thereof may include Art Pearl C 800, Art Pearl CK 400, and Art Pearl U-600T (trade names: all produced by Negami Chemical Industrial Co., Ltd.).

The resin solution contains an organic matting agent (B) of 3 to 10 parts by weight to 100 parts by weight of solid contents of the resin solution. Addition of the organic matting agent (B) makes it possible to give a coating composition from which a film excellent in dry feeling can be formed. In the present invention, the organic matting agent (B) is used for obtaining the dry feeling and use of the organic matting agent (B) gives excellent wet feeling without deteriorating the wet feeling in comparison with the use of an inorganic matting agent. If the content of the organic matting agent (B) is less than 3 parts by weight, the film is insufficient in dry feeling and inferior in the feeling of touch. If the content of the organic matting agent (B) is more than 10 parts by weight, the film is deteriorated in the strength and cannot maintain the physical properties of the film. The content of the organic matting agent (B) is more preferably 4 parts by weight or more. Also, the content of the organic matting agent (B) is more preferably 9 parts by weight or less.

The organic matting agent (B) preferably has an average particle diameter of 1 to 20 μm. If it is smaller than 1 μm, the viscosity of the coating composition is increased and the nonvolatile components are decreased at the time of coating to adversely lower the transfer efficiency and if it is lager than 20 μm, the smoothness of the film maybe deteriorated adversely. The average particle diameter is more preferably 2 to 20 μm.

The organic matting agent (B) is not particularly restricted and for example, a grounded silk powder product and urea resin may be mentioned and the grounded silk powder product is particularly preferable. If the grounded silk power product is used, a film excellent especially in dry feeling can be obtained and therefore, it is preferable. As a commercialized grounded silk powder product, Silk Protein Powder GSF manufactured by Idemitsu Technofine Co., Ltd. can be mentioned.

The foregoing resin solution is required to contain the urethane resin beads (A) and the organic matting agent (B) in total of 30 parts by weight or more to 100 parts by weight of solid contents of the resin solution. If the total content is less than 30 parts by weight, it becomes difficult obtain excellent feeling of touch, e.g. soft, wet, and dry feelings. The total content is more preferably 35 parts by weight or more. The upper limit of the total content is not particularly restricted, however it is preferably 55 parts by weight or less. If it exceeds 55 parts by weight, the film is deteriorated in the strength and cannot maintain the physical properties of the film in some cases.

The resin solution preferably contains an organotin curing catalyst of 0 to 0.05 part by weight to 100 parts by weight of the solid contents of the resin solution. The organotin curing catalyst is not particularly restricted and maybe any organotin curing catalyst promoting the curing reaction of the acrylic polyol and the polyisocyanate and examples thereof may include dibutyltin dilaurate, dioctyltin dilaurate, dibutyltin dimaleate, and dibutyltin laurate maleate. If the content of the organotin curing catalyst exceeds 0.05 part by weight to 100 parts by weight of the solid contents, it may results in a problem that the pot life is shortened. The resin solution may contain no organotin curing catalyst.

The curing agent solution to be used in combination with the resin solution in the present invention contains a polyisocyanate. The polyisocyanate is a compound containing two or more isocyanate groups. As the polyisocyanate, aliphatic or alicyclic polyisocyanates are preferable.

The aliphatic or alicyclic polyisocyanates are not particularly restricted and examples thereof may include hexamethylene diisocyanate or isophorone diisocyanate comprising isocyanurate group, urethodione group, urethane group, allophanate group, biuret group and/or oxadiazine group.

The resin solution and the curing agent solution may contain other materials based on the necessity to the extent that the feeling of touch such as soft, wet, and dry feelings and other physical properties are not deteriorated. The materials to be added are not particularly restricted and examples thereof may include binder resins such as polyester polyol, polyether polyol, acryl-modified acid graft polypropylene chloride resin; pigments such as color pigments, bright pigments, and extender pigments; leveling agents, anti-setting agents, matting agents, ultraviolet absorbers, photostabilizer, antioxidants, and viscosity adjustment agents. The materials may be added to the resin solution or to the curing agent solution.

The two package curing type polyurethane coating composition of the present invention is used for coating by mixing the resin solution and the curing agent solution immediately before the use. At the time of mixing the resin solution and the curing agent solution, it is required to adjust the acrylic polyol and the polyisocyanate so as to keep the OH group/NCO group (equivalent ratio) in the range of (4.5/1) to (1.5/1). If the OH group ratio is higher than 4.5/1, the dry feeling of the obtained film is insufficient. If the OH group ratio is lower than 1.5/1, the soft and wet feeling of the obtained film is insufficient.

The coating composition of the present invention may be used for a variety of substrates, for example, plastics, metals, glass, foamed things and their molded products and it is suitably used for molded products of plastics such as polypropylene. More particularly, it is used for automotive interior parts such as an installment panel, a center console, a door trim, and the like and light electric parts such as a radio cassette tape recorder, a computer housing and the like.

The substrates are preferably coated with primers and the coating composition of the present invention may be applied as a top coating composition by wet-on-wet to the substrates, dried and cured to form a film. The primer is not particularly restricted but may be any primer which satisfies the properties required generally for the primers, that is, the adhesion to the substrates and the film formed using the coating composition of the present invention as well as the solvent resistance, the film hardness and the like and already existing ones such as Primer RB-188 for polypropylene manufactured by Nippon Bee Chemical Co., Ltd. may be used depending on the purposes.

A method for applying the coating composition of the present invention to the above-mentioned substrates is not particularly restricted and for example, a spray coating method, a roller coating method and the like can be mentioned and in general, coating may be carried out so as to obtain the dried film thickness in the range of 20 μm (lower limit) to 45 μm (upper limit).

A method for drying and curing a film may be normal temperature curing and baking conditions. The baking conditions may be 60 to 80° C. for 10 to 60 minutes. A coated article obtained by the above-mentioned coating is also included as the present invention.

Owing to the above-mentioned constitution, the two package curing type polyurethane coating composition of the present invention is excellent in feeling of touch, all of soft, wet, and dry feelings and also desirable in general properties of a coating composition such as the high designing property, film strength, resistance to scratching, discoloration resistance, pot life, and resistance to stains with fats and oils. The coated article of the present invention has a film formed from the two package curing type polyurethane coating composition, so that the article is provided with excellent feeling of touch.

The two package curing type polyurethane coating composition of the present invention is usable for automotive interior parts such as an installment panel, a center console, a door trim, and the like and light electric parts such as a radio cassette recorder, a computer housing and the like. Further, the coated article of the present invention can be used for automotive interior parts and light electric parts with excellent feeling of touch.

BEST MODE OF THE EMBODIMENTS OF THE INVENTION

Hereinafter, the present invention will be described more in details along with Examples, however the present invention should not be limited to these Examples. Without any particular remarks, "part(s)" means "part(s) by weight" in the Examples.

Acrylic Resin Production Example 1

Xylene 530 parts by weight was charged into a four-neck flask equipped with mixing blade, a thermometer, a temperature control unit, a titration funnel, and a cooler and heated to 120° C. under stirring condition in nitrogen atmosphere. Next, monomer components comprising styrene 54 parts by weight, n-butyl acrylate 613 parts by weight, 2-hydroxyethyl methacrylate 325 parts by weight and methacrylic acid 8 parts by weight and an initiator (tert-butyl peroxy-2-ethylhexanoate) 13 parts by weight were added dropwise for 3 hours and the temperature was kept at the same temperature for 30 minutes. Further, the initiator 2 parts by weight and xylene 20 parts by weight were added dropwise for 30 minutes and the temperature was kept at the same temperature for 1 hour. After the reaction mixture was cooled to a room temperature, an acrylic polyol Ac-1 with the characteristic properties shown in Table 1 was obtained. The NV value in Table measured according to JIS K 5601-1-2 by heating at 105° C. for 3 hours. It is same in the descriptions of Examples thereafter. The urethane resin beads used here were subjected to the elasticity value measurement by measuring the load at the time of 10% deformation of the resin beads using a microhardness meter (Shimadzu Dynamic ultrafine hardness meter DU H201, manufactured by Shimadzu Corporation).

Accordingly, the measurement results were 150 g for Art Pearl C800 Black, 150 g for Art Pearl CK 400 Black, and 2500 g for Ganz Pearl GM 1001.

Acrylic Resin Production Examples 2 and 3

Acrylic resin Ac-2 and acrylic resin Ac-3 were produced from the raw materials in the ratio as described in the following Table 1 in the same manner as that of the acrylic resin Ac-1.

TABLE 1

| Product name | Ac-1 | Ac-2 | Ac-3 |
|---|---|---|---|
| Styrene | 5.4 | 9.5 | 17.2 |
| N-butyl acrylate | 61.3 | 57.3 | 57.3 |
| 2-hydroxyethyl methacrylate | 32.5 | 32.5 | 32.5 |
| Methacrylic acid | 0.8 | 0.8 | 0.8 |
| Initiator (tert-butyl peroxy-2-ethylhexanoate) | 1.5 | 1.5 | 1.5 |
| Xylene | 55.0 | 55.0 | 55.0 |
| Total | 156.5 | 156.5 | 156.5 |
| Tg(° C.) | −20° C. | −15° C. | −5° C. |
| OHV (KOHmg/g)/solid content | 140 | 140 | 140 |
| Mw | 50000 | 50000 | 50000 |
| AV (KOHmg/g)/solid content | 5.2 | 4.6 | 4.6 |
| NV % | 65 | 65 | 65 |

Production Example of Pigment Paste

A pigment paste containing nonvolatile components of 44% was obtained by dispersing a black pigment, acrylic polyol, and xylene at the following ratios shown in Table 2 by a sand grinder mill.

TABLE 2

| | |
|---|---|
| Black pigment[1] | 5.3 |
| Acrylic polyol: Ac-1 | 59.6 |
| Xylene | 35.1 |
| Total | 100.0 |

[1]Black pigment: Monarch 1300 (manufactured by Cabot Corp.)

Production Example of Coating Composition

EXAMPLE 1

Acrylic polyol Ac-1 83.7 parts, a grounded silk powder (Silk Protein Powder GSF; manufactured by Idemitsu Technofine Co. Ltd.) 4.0 parts, and ethyl 3-ethoxypropionate 52.6 parts were charged into a container equipped with a stirrer and dispersed and then successively mixed with Art Pearl C800, Art Pearl CK 400, the pigment paste, a leveling agent, a anti-setting agent, an ultraviolet absorber, and a curing catalyst solution under stirring and evenly dispersed and finally mixed with methyl isobutyl ketone 32.4 parts to obtain a coating solution with NV 36.3%. A curing agent 33.1 parts was added to the obtained coating solution 257.2 parts to obtain a coating composition of Example 1.

EXAMPLES 2 TO 6 AND COMPARATIVE EXAMPLES 1 TO 11

In the same manner as Example 1, the respective raw materials in the compositions described in the following Tables 3, 4, 5 and 6 were mixed to obtain coating compositions of Examples 2 to 6 and Comparative Examples 1 to 11.

TABLE 3

| | | | | Example 1 | | Example 2 | | Example 3 | | Compar. Ex. 1 | |
|---|---|---|---|---|---|---|---|---|---|---|---|
| Raw material | | NV % | | Solid content | Solution | Solid content | Solution | Solid content | Solution | Solid content | Solution |
| Acrylic polyol | Ac-1 | 65 | | 54.4 | 83.7 | 45.0 | 69.2 | 32.4 | 49.8 | 45.0 | 69.2 |
| | Ac-2 | 65 | | — | — | — | — | — | — | — | — |
| | Ac-3 | 65 | | — | — | — | — | — | — | — | — |
| Urethane resin beads | Art Pearl C 800 black[2] | 100 | | 14.0 | 14.0 | 18.5 | 18.5 | 22.5 | 22.5 | 18.5 | 18.5 |
| | Art Pearl CK 400 black[2] | 100 | | 14.0 | 14.0 | 18.5 | 18.5 | 22.5 | 22.5 | 18.5 | 18.5 |
| Acrylic resin beads | Ganz Pearl GM 1001[3] | 100 | | — | — | — | — | — | — | — | — |
| Crushed silk powder product | Silk Protein[4] | 100 | | 4.0 | 4.0 | 4.4 | 4.4 | 9.0 | 9.0 | — | — |
| Silica | Sylysia 3500[5] | 100 | | — | — | — | — | — | — | 4.4 | 4.4 |
| Talc | Micro Ace P4[6] | 100 | | — | — | — | — | — | — | — | — |
| | Pigment paste | 44 | | 5.0 | 11.4 | 5.0 | 11.4 | 5.0 | 11.4 | 5.0 | 11.4 |
| Curing catalyst solution | Dibutyltin dilaurate[7] | 0.23 | | 0.03 | 13.0 | 0.03 | 13.0 | 0.03 | 13.0 | 0.03 | 13.0 |
| Leveling agent | P Flat[8] | 20 | | 7.4 | 37.0 | 7.4 | 37.0 | 7.4 | 37.0 | 7.4 | 37.0 |
| Suspending agent | Disparlon 6900[9] | 4 | | 0.3 | 7.5 | 0.3 | 7.5 | 0.3 | 7.5 | 0.3 | 7.5 |
| Ultraviolet absorber | Tinuvin 328 solution[10] | 16 | | 0.9 | 5.6 | 0.9 | 5.6 | 0.9 | 5.6 | 0.9 | 5.6 |
| Solvent | Methyl isobutyl ketone | — | | — | 32.4 | — | 29.2 | — | 36.9 | — | 29.2 |
| | Ethyl 3-ethoxypropionate | — | | — | 52.6 | — | 60.9 | — | 60.0 | — | 60.9 |
| Total | | — | | 100.03 | 275.2 | 100.03 | 275.2 | 100.03 | 275.2 | 100.03 | 275.2 |
| NV % | | — | | — | 36.3 | — | 36.3 | — | 36.3 | — | 36.3 |
| Curing agent[11] | | 90 | | 29.8 | 33.1 | 25.0 | 27.8 | 18.7 | 20.8 | 25.0 | 27.8 |
| OH/NCO equivalent ratio | | — | | 2.2/1 | | 2.2/1 | | 2.2/1 | | 2.2/1 | |

TABLE 4

| Raw material | | NV % | Compar. Ex. 2 Solid content | Compar. Ex. 2 Solution | Compar. Ex. 3 Solid content | Compar. Ex. 3 Solution | Compar. Ex. 4 Solid content | Compar. Ex. 4 Solution | Compar. Ex. 5 Solid content | Compar. Ex. 5 Solution |
|---|---|---|---|---|---|---|---|---|---|---|
| Acrylic polyol | Ac-1 | 65 | 45.0 | 69.2 | 45.0 | 69.2 | 56.4 | 86.8 | 26.4 | 40.6 |
| | Ac-2 | 65 | — | — | — | — | — | — | — | — |
| | Ac-3 | 65 | — | — | — | — | — | — | — | — |
| Urethane resin beads | Art Pearl C 800 black[2] | 100 | 18.5 | 18.5 | — | — | 10.0 | 10.0 | 27.5 | 27.5 |
| | Art Pearl CK 400 black[2] | 100 | 18.5 | 18.5 | — | — | 10.0 | 10.0 | 27.5 | 27.5 |
| Acrylic resin beads | Ganz Pearl GM 1001[3] | 100 | — | — | 37.0 | 37.0 | — | — | — | — |
| Crushed silk powder product | Silk Protein[4] | 100 | — | — | 4.4 | 4.4 | 10.0 | 10.0 | 5.0 | 5.0 |
| Silica | Sylysia 3500[5] | 100 | — | — | — | — | — | — | — | — |
| Talc | Micro Ace P4[6] | 100 | 4.4 | 4.4 | — | — | — | — | — | — |
| Pigment paste | | 44 | 5.0 | 11.4 | 5.0 | 11.4 | 5.0 | 11.4 | 5.0 | 11.4 |
| Curing catalyst solution | Dibutyltin dilaurate[7] | 0.23 | 0.03 | 13.0 | 0.03 | 13.0 | 0.03 | 13.0 | 0.03 | 13.0 |
| Leveling agent | P Flat[8] | 20 | 7.4 | 37.0 | 7.4 | 37.0 | 7.4 | 37.0 | 7.4 | 37.0 |
| Suspending agent | Disparlon 6900[9] | 4 | 0.3 | 7.5 | 0.3 | 7.5 | 0.3 | 7.5 | 0.3 | 7.5 |
| Ultraviolet absorber | Tinuvin 328 solution[10] | 16 | 0.9 | 5.6 | 0.9 | 5.6 | 0.9 | 5.6 | 0.9 | 5.6 |
| Solvent | Methyl isobutyl ketone | — | — | 29.2 | — | 29.2 | — | 32.0 | — | 38.1 |
| | Ethyl 3-ethoxypropionate | — | — | 60.9 | — | 60.9 | — | 51.9 | — | 62.0 |
| Total | | — | 100.03 | 275.2 | 100.03 | 275.2 | 100.03 | 275.2 | 100.03 | 275.2 |
| NV % | | — | — | 36.3 | — | 36.3 | — | 36.3 | — | 36.3 |
| Curing agent[11] | | 90 | 25.0 | 27.8 | 25.0 | 27.8 | 30.8 | 34.2 | 15.6 | 17.3 |
| OH/NCO equivalent ratio | | — | 2.2/1 | | 2.2/1 | | 2.2/1 | | 2.2/1 | |

2) Negami Chemical Industrial., Ltd.
3) Ganz Chemical Co., Ltd.
4) Silk Protein Powder GSF, manufactured by Idemitsu Technofine Co. Ltd.
5) Fuji Sylysai., Ltd.
6) NIPPON TALC CO., LTD.
7) Dibutyltin dilaurate solution in acetate ester
8) TOYO INK MFG. CO., LTD
9) Disparlon 6900-20X (manufactured by Kusumoto Chemicals, Ltd.) diluted with xylene to have 4% on the solid weight
10) Tinuvin 328 (manufactured by Novartis Pharma K. K.) diluted with xylene/ethyl acetate=95/5 to have 16% on the solid weight
11) Duranate E-402-90T (manufactured by Asahi Kasei Corporation) solution with NCO wt. % of 8.5/90 wt. %: polyol adduct.

TABLE 5

| Raw material | | NV % | Compar. Ex. 6 Solid content | Compar. Ex. 6 Solution | Compar. Ex. 7 Solid content | Compar. Ex. 7 Solution | Compar. Ex. 8 Solid content | Compar. Ex. 8 Solution | Example 4 Solid content | Example 4 Solution | Example 5 Solid content | Example 5 Solution | Example 6 Solid content | Example 6 Solution |
|---|---|---|---|---|---|---|---|---|---|---|---|---|---|---|
| Acrylic polyol | Ac-1 | 65 | 46.4 | 71.4 | 46.4 | 71.4 | 58.4 | 89.8 | — | — | — | — | 45.0 | 69.2 |
| | Ac-2 | 65 | — | — | — | — | — | — | 45.0 | 69.2 | — | — | — | — |
| | Ac-3 | 65 | — | — | — | — | — | — | — | — | 54.4 | 83.7 | — | — |
| Urethane resin beads | Art Pearl C 800 black | 100 | 19.5 | 19.5 | 12.5 | 12.5 | 12.5 | 12.5 | 18.5 | 18.5 | 14.0 | 14.0 | 18.5 | 18.5 |
| | Art Pearl CK 400 black | 100 | 19.5 | 19.5 | 12.5 | 12.5 | 12.5 | 12.5 | 18.5 | 18.5 | 14.0 | 14.0 | 18.5 | 18.5 |
| Acrylic resin beads | Ganz Pearl GM 1001 | 100 | — | — | — | — | — | — | — | — | — | — | — | — |
| Crushed silk powder product | Silk Protein | 100 | 1.0 | 1.0 | 15.0 | 15.0 | 3.0 | 3.0 | 4.4 | 4.4 | 4.0 | 4.0 | 4.4 | 4.4 |
| Silica | Sylysia 3500 | — | — | — | — | — | — | — | — | — | — | — | — | — |
| Talc | Micro Ace P4 | — | — | — | — | — | — | — | — | — | — | — | — | — |
| Pigment paste | | 44 | 5.0 | 11.4 | 5.0 | 11.4 | 5.0 | 11.4 | 5.0 | 11.4 | 5.0 | 11.4 | 5.0 | 11.4 |
| Curing catalyst solution | Dibutyltin dilaurate | 0.23 | 0.03 | 13.0 | 0.03 | 13.0 | 0.03 | 13.0 | 0.03 | 13.0 | 0.03 | 13.0 | 0 | 0 |

TABLE 5-continued

| Raw material | | NV % | Compar. Ex. 6 Solid content | Compar. Ex. 6 Solution | Compar. Ex. 7 Solid content | Compar. Ex. 7 Solution | Compar. Ex. 8 Solid content | Compar. Ex. 8 Solution | Example 4 Solid content | Example 4 Solution | Example 5 Solid content | Example 5 Solution | Example 6 Solid content | Example 6 Solution |
|---|---|---|---|---|---|---|---|---|---|---|---|---|---|---|
| Leveling agent | P Flat | 20 | 7.4 | 37.0 | 7.4 | 37.0 | 7.4 | 37.0 | 7.4 | 37.0 | 7.4 | 37.0 | 7.4 | 37.0 |
| Suspending agent | Disparlon 6900 | 4 | 0.3 | 7.5 | 0.3 | 7.5 | 0.3 | 7.5 | 0.3 | 7.5 | 0.3 | 7.5 | 0.3 | 7.5 |
| Ultraviolet absorber | Tinuvin 328 solution | 16 | 0.9 | 5.6 | 0.9 | 5.6 | 0.9 | 5.6 | 0.9 | 5.6 | 0.9 | 5.6 | 0.9 | 5.6 |
| Solvent | MIBK | — | — | 34.0 | — | 34.0 | — | 31.6 | — | 29.2 | — | 32.4 | — | 29.2 |
| | EEP | — | — | 55.3 | — | 55.3 | — | 51.3 | — | 60.9 | — | 52.6 | — | 60.9 |
| Total | | — | 100.03 | 275.2 | 100.03 | 275.2 | 100.03 | 275.2 | 100.03 | 275.2 | 100.03 | 275.2 | 100.0 | 275.2 |
| NV % | | — | — | 36.3 | — | 36.3 | — | 36.3 | — | 36.3 | — | 36.3 | — | 36.3 |
| Curing agent | | 90 | 25.8 | 28.7 | 25.8 | 28.7 | 31.8 | 35.3 | 25.0 | 27.8 | 29.8 | 33.1 | 25.0 | 27.8 |
| OH/NCO equivalent ratio | | — | 2.2/1 | | 2.2/1 | | 2.2/1 | | 2.2/1 | | 2.2/1 | | 2.2/1 | |

TABLE 6

| Raw material | | NV % | Compar. Ex. 9 Solid content | Compar. Ex. 9 Solution | Compar. Ex. 10 Solid content | Compar. Ex. 10 Solution | Compar. Ex. 11 Solid content | Compar. Ex. 11 Solution |
|---|---|---|---|---|---|---|---|---|
| Acrylic polyol | Ac-1 | 65 | — | — | 45.0 | 69.2 | 45.0 | 69.2 |
| | Ac-2 | 65 | — | — | — | — | — | — |
| | Ac-3 | 65 | 46.4 | 71.4 | — | — | — | — |
| Urethane resin beads | Art Pearl C 800 black | 100 | 12.5 | 12.5 | 18.5 | 18.5 | 18.5 | 18.5 |
| | Art Pearl CK 400 black | 100 | 12.5 | 12.5 | 18.5 | 18.5 | 18.5 | 18.5 |
| Acrylic resin beads | Ganz Pearl GM 1001 | 100 | — | — | — | — | — | — |
| Crushed silk powder product | Silk Protein | 100 | 15.0 | 15.0 | 4.4 | 4.4 | 4.4 | 4.4 |
| Silica | Sylysia 3500 | — | — | — | — | — | — | — |
| Talc | Micro Ace P4 | — | — | — | — | — | — | — |
| | Pigment paste | 44 | 5.0 | 11.4 | 5.0 | 11.4 | 5.0 | 11.4 |
| Curing catalyst solution | Dibutyltin dilaurate | 0.23 | 0.03 | 13.0 | 0.03 | 13.0 | 0.03 | 13.0 |
| Leveling agent | P Flat | 20 | 7.4 | 37.0 | 7.4 | 37.0 | 7.4 | 37.0 |
| Suspending agent | Disparlon 6900 | 4 | 0.3 | 7.5 | 0.3 | 7.5 | 0.3 | 7.5 |
| Ultraviolet absorber | Tinuvin 328 solution | 16 | 0.9 | 5.6 | 0.9 | 5.6 | 0.9 | 5.6 |
| Solvent | MIBK | — | — | 34.0 | — | 29.2 | — | 29.2 |
| | EEP | — | — | 55.3 | — | 60.9 | — | 60.9 |
| Total | | — | 100.03 | 275.2 | 100.03 | 275.2 | 100.03 | 275.2 |
| NV % | | — | — | 36.3 | — | 36.3 | — | 36.3 |
| Curing agent | | 90 | 25.8 | 28.7 | 11.0 | 12.2 | 42.2 | 46.9 |
| OH/NCO equivalent ratio | | — | 2.2/1 | | 5/1 | | 1.3/1 | |

Coating Method of Specimen

The obtained respective coating compositions were diluted with a thinner of ethyl acetate/ethyl 3-ethoxypropionate=50/50 parts by weight so as to adjust the viscosity to be 14 seconds measured at 20° C. by #4 Ford Cup viscometer and applied by spray coating to specimens of polypropylene, which had a size of 70 mm×100 mm×3 mm and were previously coating in a dry film thickness of 13 μm with a primer for polypropylene (RB-188: manufactured by Nippon Bee Chemical Co., Ltd.) and cured by baking at 80° C. for 30 minutes to obtain specimens coated with the respective coating compositions with a dry film thickness of 35 μm.

Evaluation Methods

The specimens obtained in the above-mentioned Examples were evaluated on the basis of the following standards. The results are shown in Tables 7, 8, and 9.

<Soft Feeling>

The feeling at the time of touching the specimens with fingers was evaluated on the basis of the following standards.

◯: elastic feeling at the time of touching the surface of each specimen coated with the cured film with fingers;

Δ: slightly insufficient elastic feeling at the time of touching the surface of each specimen coated with the cured film with fingers, however no practical problem for practical use;

x: hard touch at the time of touching the surface of each specimen coated with the cured film with fingers <Wet Feeling>

The feeling at the time of touching the specimens with fingers was evaluated on the basis of the following standards.

◯: properly wet feeling at the time of touching the surface of each specimen coated with the cured film with fingers;

x: no wet feeling at the time of touching the surface of each specimen coated with the cured film with fingers <Dry Feeling>

The feeling at the time of touching the specimens with fingers was evaluated on the basis of the following standards.

○: properly dry feeling at the time of touching the surface of each specimen coated with the cured film with fingers;

x: no dry feeling at the time of touching the surface of each specimen coated with the cured film with fingers <Wet and Dry Feelings>

The above-mentioned wet feeling and dry feeling were comprehensively evaluated and for the specimens good in both, ○ was marked and for the specimens inferior in either one, x was marked.

<Discoloration Resistance>

Each specimen coated with a cured film was installed in a vibration type friction rigidity tester. On the other hand, six sheets of gauze were attached to a friction element and made wet with 1 ml xylene. A weight of 800 g was put on the friction pole and a friction test by reciprocating the friction element 10 times and the staining degree of the gauze face was observed with eyes and the discoloration resistance was evaluated on the basis of the following standards.

○: no stain observed;

x: stains observed

<Resistance to Scratching>

The surface of each specimen coated with a cured film was scratched with claws and existence of scratches was observed with eyes and the resistance to scratching was evaluated on the basis of the following standards.

○: no scratch observed;

x: scratches observed

<Resistance to Stains with Fats and Oils>

Beef tallow (a reagent) was evenly applied to and spread in a thickness of 2 g/100 cm$^2$ on the surface of each specimen coated with a cured film and left in a closed container at 80° C. for 7 days. Then, the surface was observed with eyes and the evaluation was carried out on the basis of the following standards.

○: no abnormality of the film surface such as stains or blister observed;

x: abnormality of the film surface such as stains or blister observed

TABLE 7

|  |  | Ex. 1 | Ex. 2 | Ex. 3 | Compar. Ex. 1 | Compar. Ex. 2 | Compar. Ex. 3 | Compar. Ex. 4 | Compar. Ex. 5 |
| --- | --- | --- | --- | --- | --- | --- | --- | --- | --- |
| Feeling of touch | Soft feeling | ○ | ○ | ○ | ○ | ○ | X | X | ○ |
|  | Moisture and dry feeling | ○ | ○ | ○ | X | X | X | X | ○ |
| Content | Moisture feeling | ○ | ○ | ○ | X | X | X | X | ○ |
|  | Dry feeling | ○ | ○ | ○ | ○ | ○ | ○ | ○ | ○ |
| Discoloration resistance |  | ○ | ○ | ○ | ○ | ○ | ○ | ○ | X |
| Resistance to scratching |  | ○ | ○ | ○ | ○ | ○ | ○ | ○ | X |
| Resistance to stains with fats and oils |  | ○ | ○ | ○ | ○ | ○ | ○ | ○ | X |

TABLE 8

|  |  | Compar. Ex. 6 | Compar. Ex. 7 | Compar. Ex. 8 | Ex. 4 | Ex. 5 | Ex. 6 |
| --- | --- | --- | --- | --- | --- | --- | --- |
| Feeling of touch | Soft feeling | ○ | ○ | X | ○ | Δ | ○ |
|  | Moisture and dry feeling | X | ○ | X | ○ | ○ | ○ |
| Content | Moisture feeling | ○ | ○ | X | ○ | ○ | ○ |
|  | Dry feeling | X | ○ | X | ○ | ○ | ○ |
| Discoloration resistance |  | ○ | X | ○ | ○ | ○ | ○ |
| Resistance to scratching |  | ○ | X | ○ | ○ | ○ | ○ |
| Resistance to stains with fats and oils |  | ○ | X | ○ | ○ | ○ | ○ |

TABLE 9

|  |  | Compar. Ex. 9 | Compar. Ex. 10 | Compar. Ex. 11 |
| --- | --- | --- | --- | --- |
| Feeling of touch | Soft feeling | X | ○ | X |
|  | Moisture and dry feeling | ○ | X | X |
| Content | Moisture feeling | ○ | ○ | X |
|  | Dry feeling | ○ | X | ○ |
| Discoloration resistance |  | X | X | ○ |
| Resistance to scratching |  | X | X | ○ |
| Resistance to stains with fats and oils |  | X | X | ○ |

From the results shown in Tables 7, 8, and 9, it was found that the two package curing type polyurethane coating compositions of the present invention were excellent in both wet and dry feelings, meanwhile the two package curing type polyurethane coating compositions of Comparative Examples were inferior in either one of wet feeling and dry feeling, or inferior in general physical properties of a film such as discoloration resistance, resistance to scratching, and resistance to stains with fats and oils and therefore, they were unsuitable for the practical use.

The invention claimed is:

1. A two package curing polyurethane coating composition, comprising:
   a resin solution comprising an acrylic polyol, and
   a curing agent solution comprising a polyisocyanate,
   wherein the resin solution comprises
      urethane resin beads (A) in the amount of 25 to 50 parts by weight, and
      an organic matting agent (B) in the amount of 3 to 10 parts by weight, and
   wherein said resin solution comprises said urethane resin beads (A) and said organic matting agent (B) in a total amount of 30 parts by weight or more, respectively, based on 100 parts by weight of solid contents of the resin solution, and
   wherein said acrylic polyol and said polyisocyanate have an OH group/NCO group (equivalent ratio) in the range of (4.5/1) to (1.5/1);
   wherein the organic matting agent (B) is a grounded silk powder product.

2. The two package curing polyurethane coating composition according to claim 1,
   wherein the acrylic polyol has a glass transition temperature (Tg) of −10° C. or lower.

3. The two package curing polyurethane coating composition according to claim 1, or 2,
   wherein the resin solution contains an organotin curing catalyst in the amount of 0 to 0.05 part by weight to 100 parts by weight of the solid contents of the resin solution.

4. A coated article having a film on the surface, wherein said film is formed using the two package curing polyurethane coating composition according to claim 1 or 2.

5. The two package curing polyurethane coating composition according to claim 1, wherein said acrylic polyol is an acrylic resin having hydroxyl groups.

6. The two package curing polyurethane coating composition according to claim 1, wherein said acrylic polyol contains in polymerized form monomer units selected from the group consisting of hydroxyethyl acrylate, hydroxyethyl methacrylate, hydroxypropyl methacrylate, hydroxybutyl acrylate, ε-caprolactone-modified hydroxyethyl methacrylate, polyethylene glycol monoacrylate, polyethylene glycol monomethacrylate, polypropylene glycol monoacrylate, and polypropylene glycol monomethacrylate.

7. The two package curing polyurethane coating composition according to claim 1, wherein said acrylic polyol contains in polymerized form monomer units selected from the group consisting of acrylic acid, methacrylic acid, itaconic acid, crotonic acid, and maleic acid.

8. The two package curing polyurethane coating composition according to claim 1, wherein said acrylic polyol has a hydroxyl value of 90 to 200 KOHmg/g.

9. The two package curing polyurethane coating composition according to claim 1, wherein said acrylic polyol has a weight average molecular weight of 20000 to 80000.

10. The two package curing polyurethane coating composition according to claim 1, wherein said urethane resin beads (A) have an average particle diameter of 5 to 25 μm.

11. The two package curing polyurethane coating composition according to claim 1, wherein said urethane resin beads (A) have an elasticity value of 200 g or less.

12. The two package curing polyurethane coating composition according to claim 1, wherein said organic matting agent (B) has an average particle diameter of 1 to 20 μm.

13. The two package curing polyurethane coating composition according to claim 1, wherein said resin solution contains an organotin curing catalyst in an amount of not more than 0.05 part by weight based on 100 part by weight of the solid contents of the resin solution.

14. The two package curing polyurethane coating composition according to claim 1, wherein said resin solution contains not more than 0.05 part by weight of dibutyltin dilaurate, dioctyltin dilaurate, dibutyltin dimaleate, or dibutyltin laurate maleate based on 100 part by weight of the solid contents of the resin solution.

15. The two package curing polyurethane coating composition according to claim 1, wherein said polyisocyanate is aliphatic or alicyclic.

* * * * *